US010080255B2

(12) United States Patent
Touati et al.

(10) Patent No.: US 10,080,255 B2
(45) Date of Patent: Sep. 18, 2018

(54) MOBILE ROUTER IN EPS

(71) Applicant: TELEFONAKTIEBOLAGET L M ERICSSON (PUBL), Stockholm (SE)

(72) Inventors: Samy Touati, San Jose, CA (US); Göran Hall, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 736 days.

(21) Appl. No.: 14/312,195

(22) Filed: Jun. 23, 2014

(65) Prior Publication Data
US 2014/0301274 A1    Oct. 9, 2014

Related U.S. Application Data

(63) Continuation of application No. 13/153,015, filed on Jun. 3, 2011, now Pat. No. 8,806,042.
(Continued)

(51) Int. Cl.
*G06F 13/00*      (2006.01)
*H04W 88/10*    (2009.01)
(Continued)

(52) U.S. Cl.
CPC .......... *H04W 88/10* (2013.01); *H04L 63/162* (2013.01); *H04W 12/06* (2013.01);
(Continued)

(58) Field of Classification Search
CPC .......... H04L 63/162; H04L 29/06952; H04W 12/06; H04W 88/10; H04W 84/005; H04W 84/047; H04W 84/12
(Continued)

(56) References Cited

U.S. PATENT DOCUMENTS 8,806,042 B2 *  8/2014  Touati .................. H04L 63/162
                                                                709/227
2009/0068986 A1  3/2009  Wang
(Continued)

FOREIGN PATENT DOCUMENTS

| JP | 2009-171543 A | 7/2009 |
| KR | 20090024655 | 3/2009 |
| WO | WO 2010/109902 A1 | 9/2010 |

OTHER PUBLICATIONS

Thubert P. et al: "Mobile Network Prefix Delegation; draft-ietf-nemo-prefix-delegation-02. txt", Internet Engineering Task Force (IETF), Aug. 21, 2007 (Aug. 21, 2007), whole document.
(Continued)

*Primary Examiner* — Kenneth R Coulter

(57) ABSTRACT

A method of proxy operation at a mobile router includes connecting to a plurality of machine-type communication (MTC) devices via a southbound interface of the mobile router that uses a first radio access technology, and connecting to a mobile communication network via a northbound interface of the mobile router that uses a second radio access technology. The method further includes establishing a main communication session between the mobile router and the mobile communication network via the northbound interface, including authenticating the mobile router to the mobile communication network, and operating as a proxy for the plurality of MTC devices. Such operation includes relaying signaling between individual ones of the plurality of MTC devices and the mobile communication network via respective sub-sessions of the main communication session.

10 Claims, 9 Drawing Sheets

Related U.S. Application Data

(60) Provisional application No. 61/444,584, filed on Feb. 18, 2011.

(51) Int. Cl.
    *H04L 29/06*     (2006.01)
    *H04W 12/06*     (2009.01)
    *H04W 84/00*     (2009.01)
    *H04W 84/04*     (2009.01)
    *H04W 84/12*     (2009.01)

(52) U.S. Cl.
    CPC ........ *H04W 84/005* (2013.01); *H04W 84/047* (2013.01); *H04W 84/12* (2013.01)

(58) Field of Classification Search
    USPC .............. 709/227–229, 238, 250, 245; 726/4
    See application file for complete search history.

(56) References Cited

U.S. PATENT DOCUMENTS

| | | |
|---|---|---|
| 2010/0103845 A1 | 4/2010 | Ulupinar et al. |
| 2010/0137021 A1* | 6/2010 | Sharret ................. H04W 88/04 455/550.1 |
| 2012/0020318 A1 | 1/2012 | Naoe et al. |

OTHER PUBLICATIONS

"Relay architectures for E-UTRA (LTE-Advanced) (Release 9) 3GPP TR 36.806", 3rd Generation Partnership Project (3GPP), Mar. 2010 (201-03), sections 4.2.2; 4.2.4.1; 4.2.4.4.

3GPP TS 23.402 version 9.7.0 Release 9 (2010-12) 3rd Generation Partnership Project; Technical y Specification Group Services and System Aspects; Architecture enhancements for non-3GPP accesses, the whole document.

Devarapalli V. et al: "Network Mobility (NEMO) Basic Support Protocol", RFC 3963, Internet Engineering Task Force (IETF), Jan. 2005 (Jan. 2005), XP015009735, sect. 3 sect. 5.5.

* cited by examiner

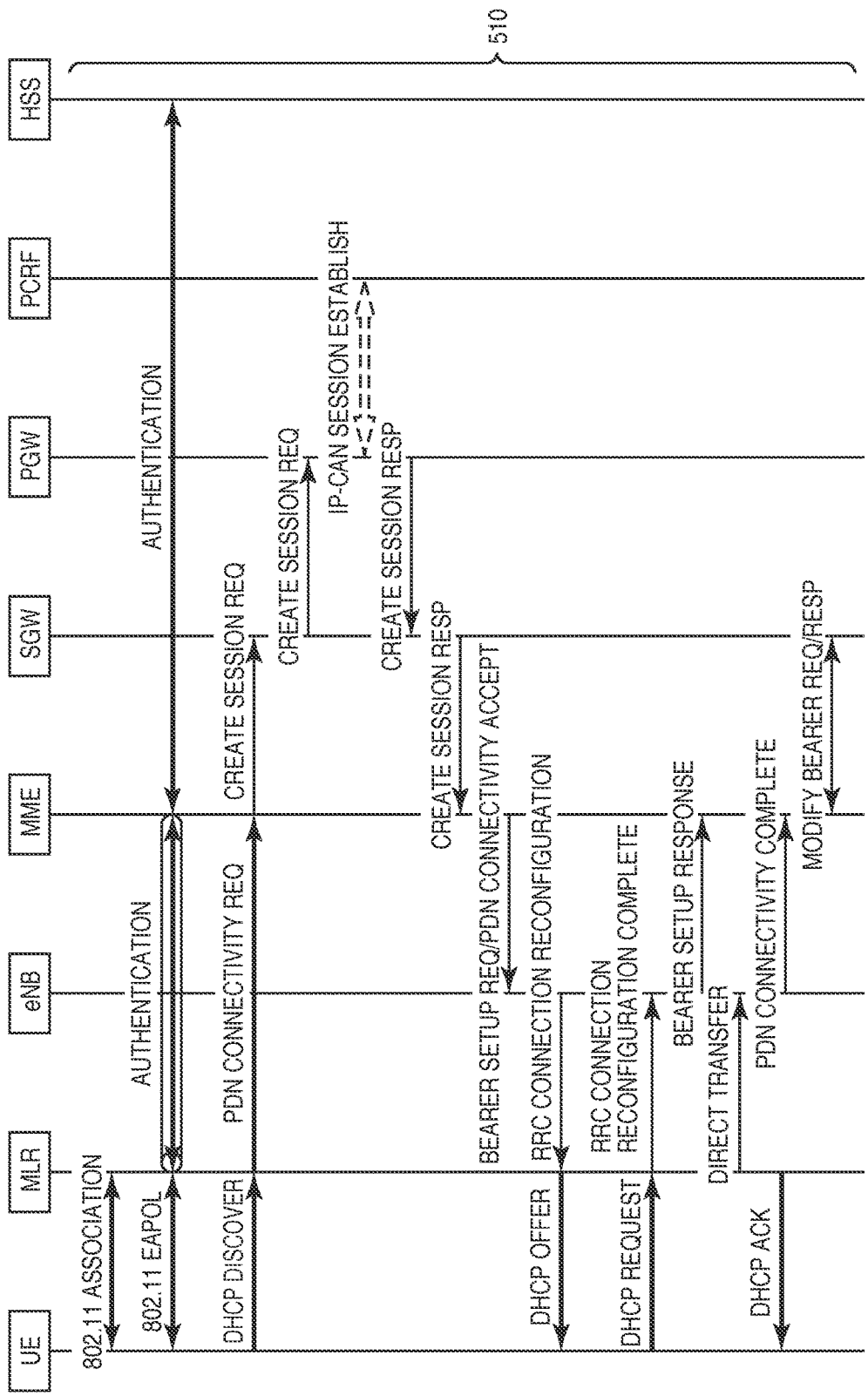

MOBILE ROUTER IN EPS

CROSS-REFERENCE TO RELATED APPLICATIONS

This application claims priority under 35 U.S.C. § 119(e) to Provisional Patent Application Ser. No. 61/444,584, filed Feb. 18, 2011, and is a Continuation of U.S. patent application Ser. No. 13/153,015, filed Jun. 3, 2011. The entire contents of each of the aforementioned applications are incorporated herein by reference.

FIELD OF TECHNOLOGY

The present application relates to mobile routers, in particular mobile routers that enable message routing between a mobile communication network and wireless devices connected to the mobile router.

BACKGROUND

An existing function today is the "Routing behind MS" feature supported by the Ericsson GGSN-MPG (Gateway GPRS Support Node-Mobile Packet Gateway), where a single UE (User Equipment) acts as a router for several devices and where the Radius served assigns a subnet to this UE/router instead of a single IP address. The subnet is used by the devices connecting to the UE/router. There are also devices that act as gateways with NAT (Network Address Translation) capabilities, where a northbound interface connects with a mobile communication network through HSPA (High Speed Packet Access) or LTE (long term evolution) and a southbound interface is WiFi based and connects with wireless devices. Such a gateway hides the existence of the southbound connected devices, and is seen by the mobile network as a single mobile.

The implementations described above make use of the subscription of the UE router that is connecting to the LTE base station. If a mobile router is used, all the users located on the southbound interface share the subscription of the mobile router.

As another separate concept, EPS (3GPP Evolved Packet System) can support the concept of a donor eNB (donor enhanced NodeB or DeNB for short) supporting the LTE relay. The DeNB has a modified version of the E-UTRAN (Evolved UMTS Terrestrial Radio Access Network) radio interface, the modified version referred to as the Un interface. This allows 3GPP LTE based devices to connect to the eNB through the DeNB.

If Relay model is used instead for UEs connecting via another mobile device, the model assumes that the mobile devices use the E-UTRAN radio interface. As such, it is desirable to achieve the relay function, where each device connects through its own subscription, but uses a different radio interface such as WiFi.

SUMMARY

A mobile router is provided with at least two different types of interfaces. One interface is a radio access network interface such as an E-UTRAN interface on its northbound link for connecting the mobile router to a radio access network such as an LTE network. The mobile router also has a non-radio access network interface such as an 802.1x interface on its southbound link. The mobile router acts e.g. as an 802.1x access point (AP) for UEs which connect to the southbound link of the mobile router via WiFi or another radio technology such as Zigbee, or even LTE. The mobile router enables the attached devices to be uniquely authenticated and served by the radio access network. As such, devices connected to the mobile router on its southbound interface (i.e. the non-radio access network interface) are seen as individual devices attaching to the mobile router by the radio access network, and are accessible through respective network-assigned IP addresses. The devices connected to the southbound interface of the mobile router are therefore individually identifiable and serviceable by the radio access network.

According to one embodiment, a method of proxy operation at a mobile router includes connecting to a plurality of machine-type communication (MTC) devices via a southbound interface of the mobile router that uses a first radio access technology, and connecting to a mobile communication network via a northbound interface of the mobile router that uses a second radio access technology. The method further includes establishing a main communication session between the mobile router and the mobile communication network via the northbound interface, including authenticating the mobile router to the mobile communication network, and operating as a proxy for the plurality of MTC devices. Such operation includes relaying signaling between individual ones of the plurality of MTC devices and the mobile communication network via respective sub-sessions of the main communication session.

According to one embodiment of a mobile router, the router includes a southbound interface configured for communicatively connecting to a plurality of machine-type communication (MTC) devices using a first radio access technology, and a northbound interface configured for communicatively connecting to a mobile communication network using a second radio access technology. The mobile router further includes one or more processing circuits operatively associated with the southbound and northbound interfaces.

The one or more processing circuits are configured to connect to the plurality of MTC devices via the southbound interface, establish a main communication session between the mobile router and the mobile communication network via the northbound interface, including authenticating the mobile router to the mobile communication network, and operate as a proxy for the plurality of MTC devices. Proxy operation includes relaying signaling between individual ones of the plurality of MTC devices and the mobile communication network via respective sub-sessions of the main communication session.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

FIGS. 5A and 5B illustrate an embodiment of a messaging procedure implemented by a mobile router for authenticating and connecting WiFi wireless devices to a mobile communication network.

DETAILED DESCRIPTION

Figure 1:
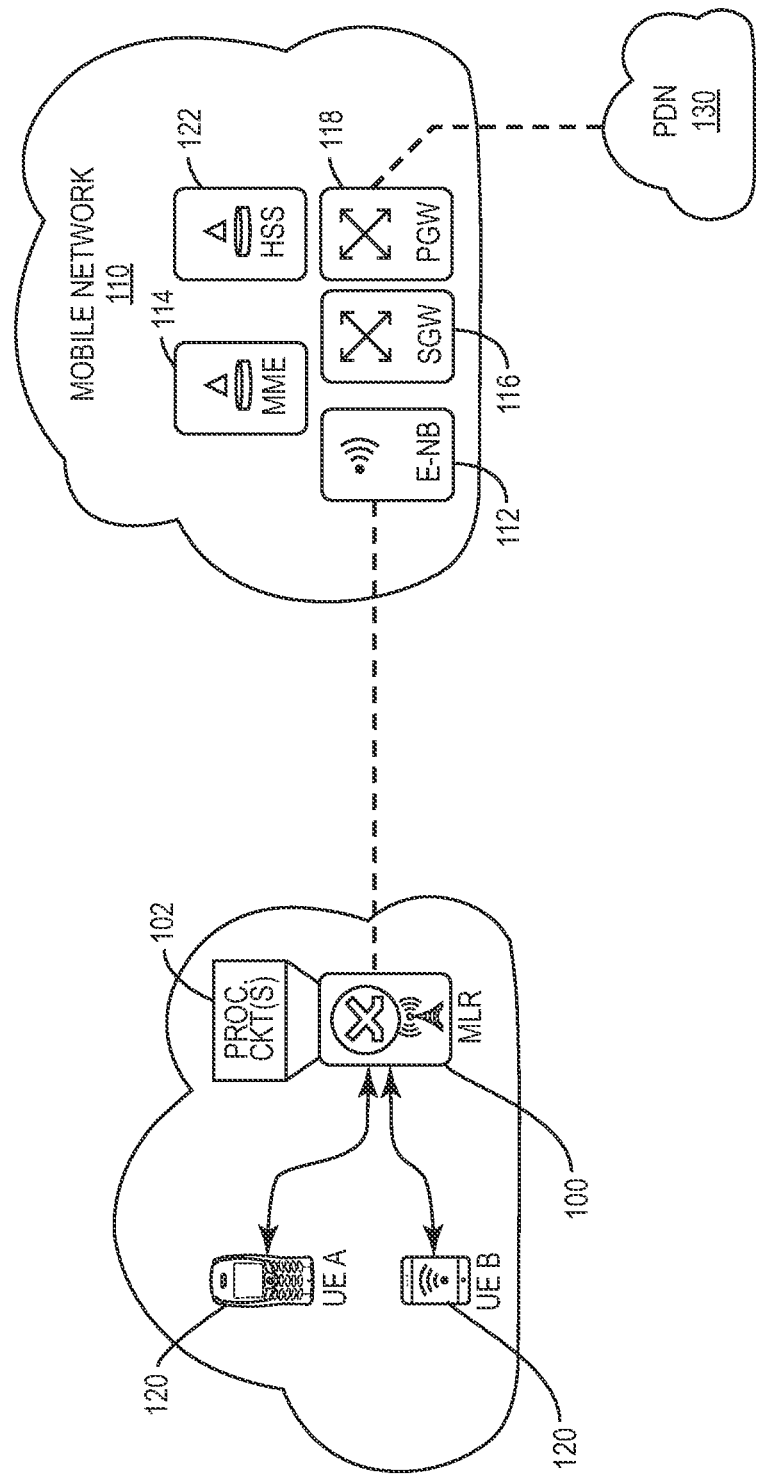
FIG. 1 illustrates an embodiment of a mobile router for connecting wireless devices to a mobile communication network.

FIG. 1 illustrates an embodiment of a mobile router 100 which enables message routing between a mobile communication network 110 and wireless devices 120. The mobile router 100 provides an interface between the wireless devices 120 and the mobile communication network 110 in a way that enables the wireless devices 120 to be uniquely authenticated and served by the mobile communication network 110. To this end, the mobile router 100 includes one or more processing circuits 102 operable to establish a communication session with the mobile communication network 110. As part of the session establishment, the mobile router 100 is assigned an IP address. The processing circuit(s) 102 are further operable to authenticate a wireless device 120 to the mobile communication network 110 so that the wireless device 120 is uniquely identifiable to the mobile communication network 110. The processing circuit(s) 102 are also operable to establish a new packet data network (PDN) connection between the wireless device 120 and the mobile communication network 110 over the communication session based on an IP address uniquely assigned to the wireless device 120 by the mobile communication network 110.

The processing circuit(s) 102 included in the mobile router 110 can include any type of hardware and/or software suitable for implementing these procedures. For example, the processing circuit(s) 102 may include one or more baseband processors, microprocessors, microcomputers, digital signal processors (DSPs), special-purpose hardware, such as an application specific integrated circuit (ASIC) and programmable logic devices, controllers, memory, firmware, software, and/or any combination thereof.

Providing access to the mobile communication network 110 via the mobile router 100 puts a minimum requirement on the client wireless devices 120 in terms of authentication and encryption of the traffic. The mobile router 100 has at least two different types of interfaces to provide such access. One interface is a non-radio access network interface such as an 802.1x interface (e.g. WiFi) on its southbound link i.e. the link between the mobile router 100 and the wireless devices 120. The mobile router 100 also has a radio access network interface such as an E-UTRAN interface on its northbound link i.e. the link between the mobile router 100 and the mobile communication network 110. According to this embodiment, the mobile router 100 acts as an 802.1x access point (AP) for the wireless devices 120 which connect to the mobile router 100 via WiFi or other radio technology such as Zigbee or even LTE.

The wireless device attach and authentication procedures enabled by the mobile router 100 permit the attached wireless devices 120 to be uniquely authenticated and served by the mobile communication network 110. As such, wireless devices 120 connected to the mobile router 100 on the router southbound interface (i.e. the non-radio access network interface) are seen as individual devices attaching to the mobile router 100 by the mobile communication network 110, and are reachable through respective network-assigned IP addresses. In one embodiment, the IP addresses uniquely assigned to the respective wireless devices 120 are derived from a subnet allocated to the mobile router 100 by the mobile communication network 110.

The mobile router 100 can serve different types of wireless devices 120. For example, the mobile router 100 can serve wireless devices 120 such as regular computing devices which use WiFi access technology, including mobile phones with WiFi interfaces. Another type of wireless device 120 served by the mobile router 100 are low power and/or limited functionality devices which attach to the mobile router 100 using WiFi or another radio access technology, including MTC (machine-type communication) devices. Each device 120 connected to the mobile router 110 on the southbound interface of the router 100 is visible at the network level, and the mobile communication network 110 provides a set of services associated with the subscription of the corresponding individual device 120.

Operation of the mobile router 100 is described next in more detail in the context of an LTE radio access network 110, but can be readily applied to any radio access technology. As such, the mobile router 100 is also referred to as MLR (mobile LTE router). The MLR 100 handles the radio link toward the LTE radio network 110, including e.g. physical layer, layer-2 and RRC (radio resource control) functionality, in order to wirelessly connect to a base station 112 such an eNB (enhanced NodeB) of the LTE radio network 110. The MLR 100 also terminates the EPS bearers, keeping the TFTs (traffic flow templates) for mapping different IP flows from different wireless devices 120 connected to the MLR 100 on the southbound interface to the correct EPS bearer.

In FIG. 1 for example, if a 3GPP device (e.g. UE A) connects to the southbound interface of the MLR 100 using LTE radio access technology, the MLR 100 relays the signalling of the 3GPP device within a sub-session of the main session previously established for the MLR 100 with the LTE radio network 110. If another device (e.g. UE B) uses WiFi or other radio technology to connect with the southbound interface of the MLR 100, the MLR 100 maps relevant parameters from the WiFi (or other) session to a sub-session of the already established main session MLR toward the LTE network 110. The particular implementation dictates when the MLR 100 starts or stops serving UEs 120. Also, the MLR 100 preferably does not use another MLR for connection to the LTE network 110, i.e. cascading of MLRs is not preferred.

The MLR 100 provides network connectivity to the wireless devices 120 through its northbound (e.g. LTE based) interface. For Wi-Fi based UE devices 120 such as mobile phones with Wi-Fi access, the MLR 100 acts as a relay/inter-working function with the mobile core network 110. In one embodiment, the MLR 100 creates sub-sessions in addition to the main session the MLR 100 created with the LTE network 110. These sub-sessions represent or correspond to new PDN connections established between the UE devices 120 and the LTE network 110 over the communication session established with the LTE network 110.

Figure 2:
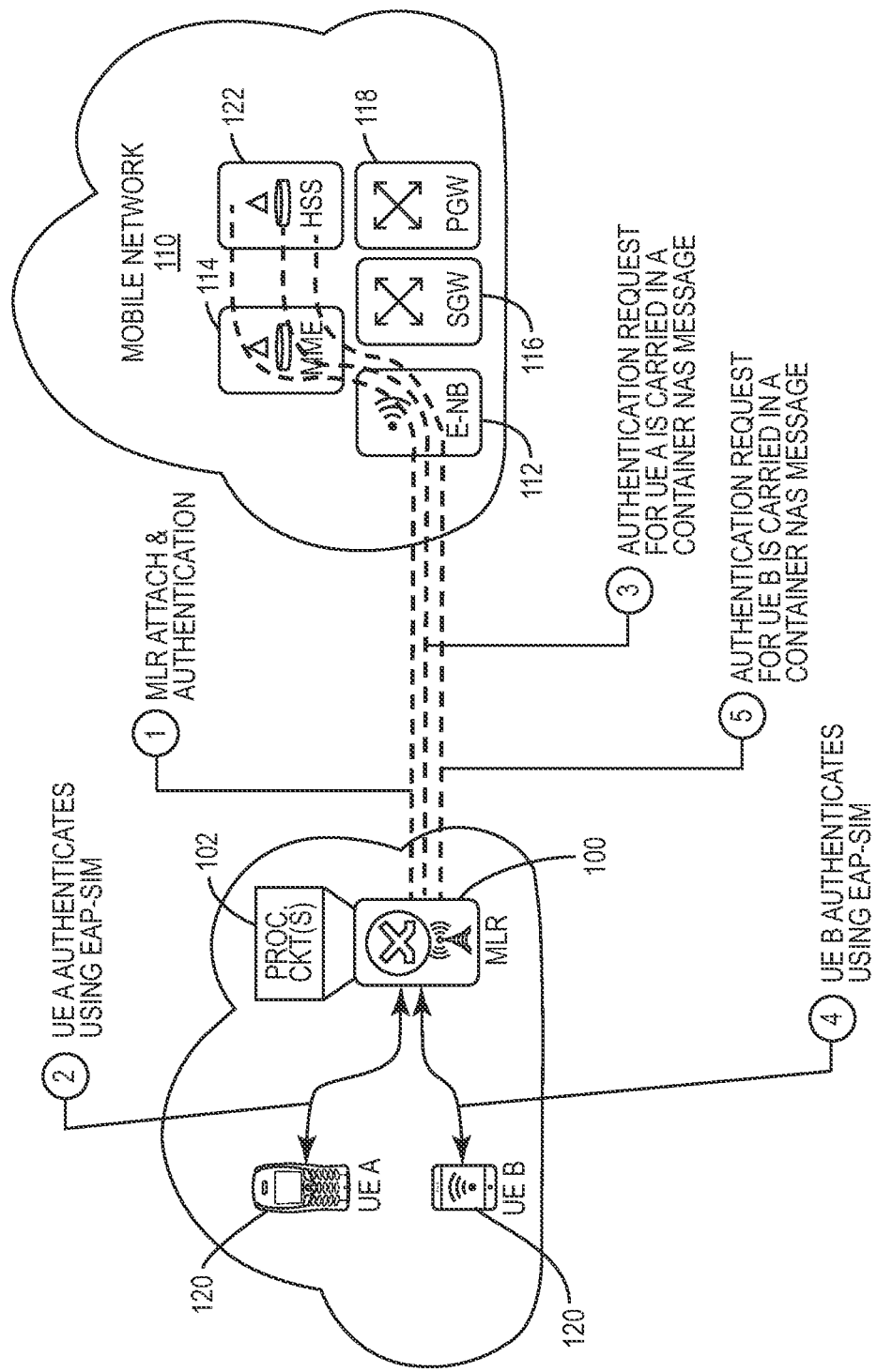
FIG. 2 illustrates an embodiment of a mobile router during authenticating LTE wireless devices to a mobile communication network and the connecting UEs authenticating via the mobile router.
Figure 3A:
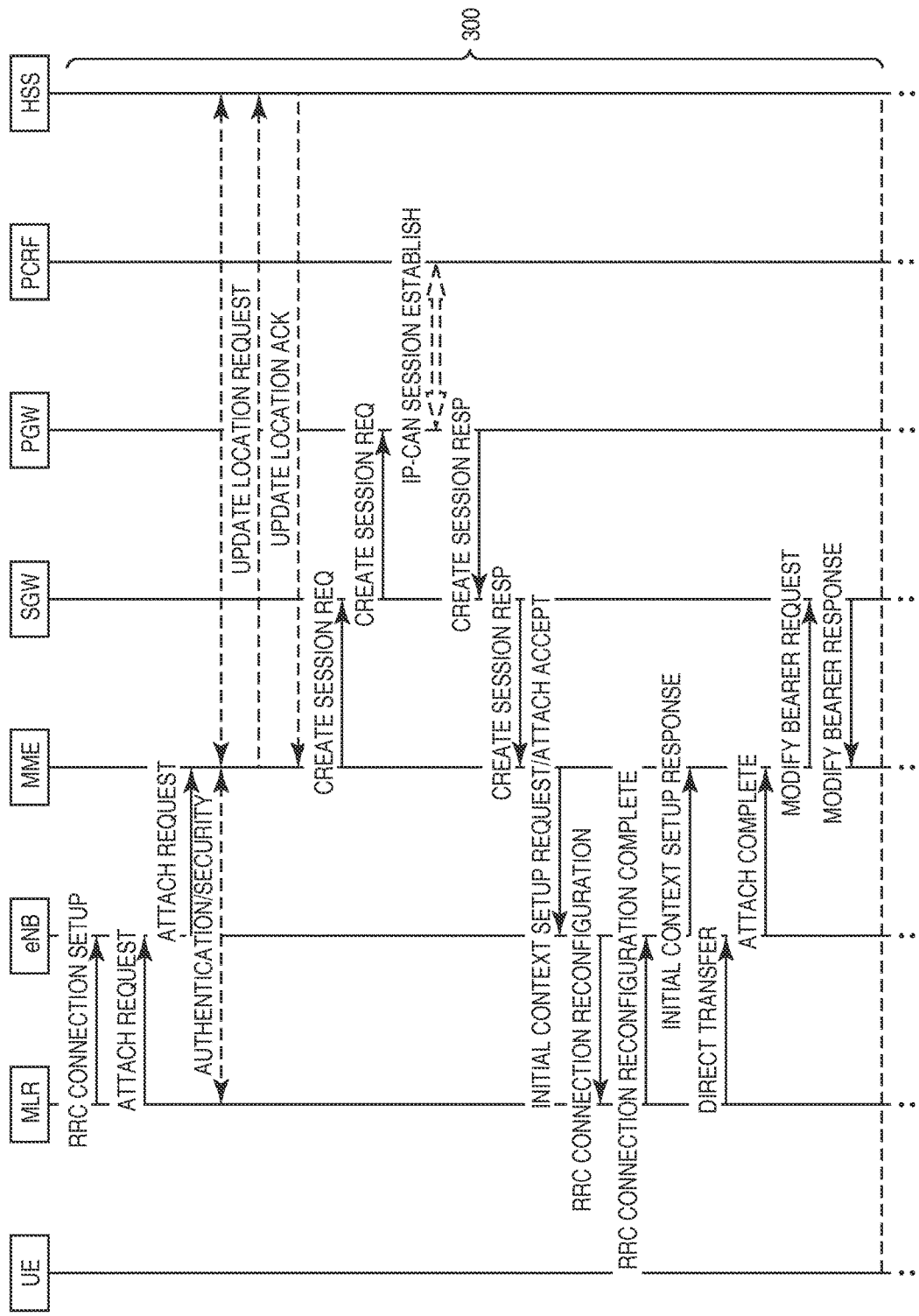
FIGS. 3A and 3B illustrate an embodiment of a messaging procedure implemented by a mobile router for authenticating and connecting LTE wireless devices to a mobile communication network.

FIG. 2 shows an embodiment where the wireless devices (UE A and UE B) are 3GPP devices. The MLR 100 performs a conventional attach and authentication procedure (Step 1 in FIG. 2) with the LTE network 110 over the northbound interface of the MLR 100 via the eNB 112 of the LTE network 110, e.g. as illustrated by the typical sequence of requests and responses shown in region 300 of FIG. 3A where MME 114 is the mobility management entity of the LTE network 110, SGW 116 is the serving gateway of the LTE network 110, PGW 118 is the packet data network gateway of the LTE network 110, PCRF 120 is the policy charging and rules function of the LTE network 110, and HSS 122 is the home subscriber server of the LTE network 110.

Figure 3B:
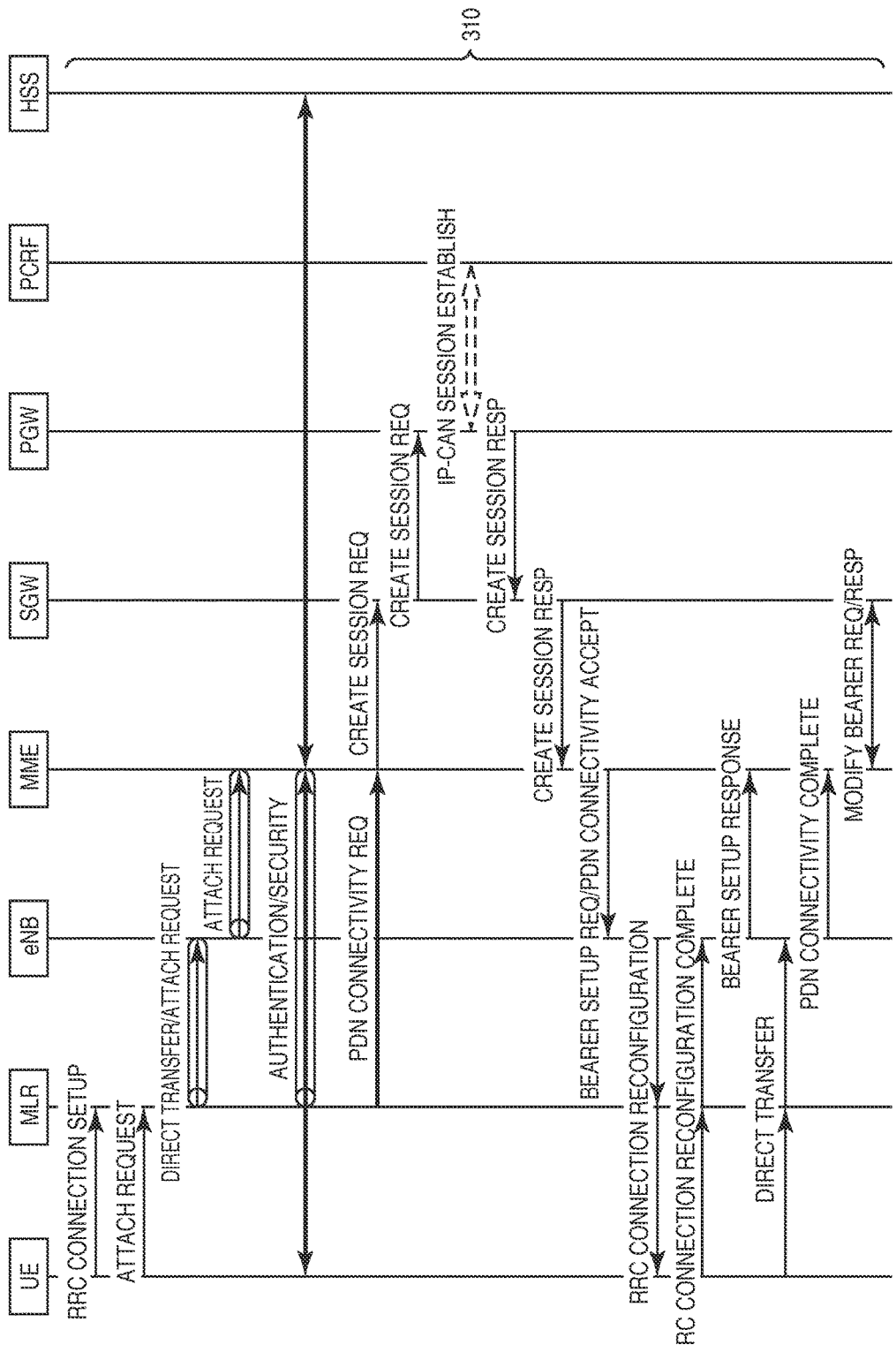

UE A connects to the southbound interface of the MLR 100 using LTE radio access technology and the MLR 100 performs authentication through the use of a SIM (subscriber identity module) card, or a soft SIM for example (Step 2 in FIG. 2), e.g. as illustrated by the sequence of requests and responses shown in region 310 of FIG. 3B. Particularly, the MLR 100 receives an RRC connection setup request and an attach request from UE A over the router southbound interface. The MLR 100 forwards the attach request to the eNB 112 of the LTE network 110 over the router northbound interface. The eNB 112 in turn forwards the request to the MME 114 which is a control node for the LTE network 110. An authentication/security procedure is implemented between UE A, the MLR 100 and the LTE network 110 whereby UE A is authenticated. In one embodiment, the MLR 100 uses EAP-SIM (extensible authentication protocol method for GSM subscriber identity module) to authenticate UEs. EAP-SIM is an extensible authentication protocol (EAP) mechanism for authentication and session key distribution using the GSM (global system for mobile communications) subscriber identity module (SIM) and is described in RFC 4186. For example, UE A and UE B may use a SIM card which stores a service-subscriber key (IMSI) uniquely identifying each subscriber and can be sent to the MLR 100 for implementing user authentication. The MLR 100 sends the authentication request in a container NAS (non-access stratum) message to the LTE network 110 (Step 3 in FIG. 2). The MLR likewise performs SIM authentication and authentication request forwarding for UE B (Steps 4 and 5 in FIG. 2).

After a UE is authenticated, the MLR 100 sends a PDN connectivity request to the MME 114 via the eNB 112. The MME 114 generates a create session request which is forwarded to the PGW 118 via the SGW 116. The SGW 116 routes and forwards user data packets and acts as a mobility anchor for the user plane during inter-eNodeB handovers and as an anchor for mobility between LTE and other 3GPP technologies. The PGW 118 provides connectivity from UEs to external PDNs 130 by acting as a point of exit and entry of traffic for the UEs.

In response to the create session request, the PGW 118 and PCRF 120 establish an IP-CAN (IP Connectivity Access Network) session which enables a UE to begin a session such as voice telephony, streaming, etc. The PGW 118 sends a create session response to the SGW 116, which in turn forwards the response to the MME 114. The MME 114 generates a PDN connectivity accept message which indicates the IP-CAN session has been established, and sends the accept message to the eNB 112. In response, the eNB 112 performs bearer setup and initiates RRC connection reconfiguration with the MLR 100. The MLR 100 likewise initiates RRC connection reconfiguration with the corresponding UE. Upon completion of the RRC connection reconfiguration, direct transfer of messages is permitted from the UE to the MLR 100 on the router southbound interface and between the MLR 100 and the eNB 112 on the router northbound interface. The eNB 112 notifies the MME 114 that PDN connectivity is complete. In each case, sub-sessions associated with each LTE UE are anchored to the main MLR session. The MME 114 and SGW 116 can perform bearer modification if desired, and bearer enforcement and mapping may be different depending on the particular device.

Figure 4:
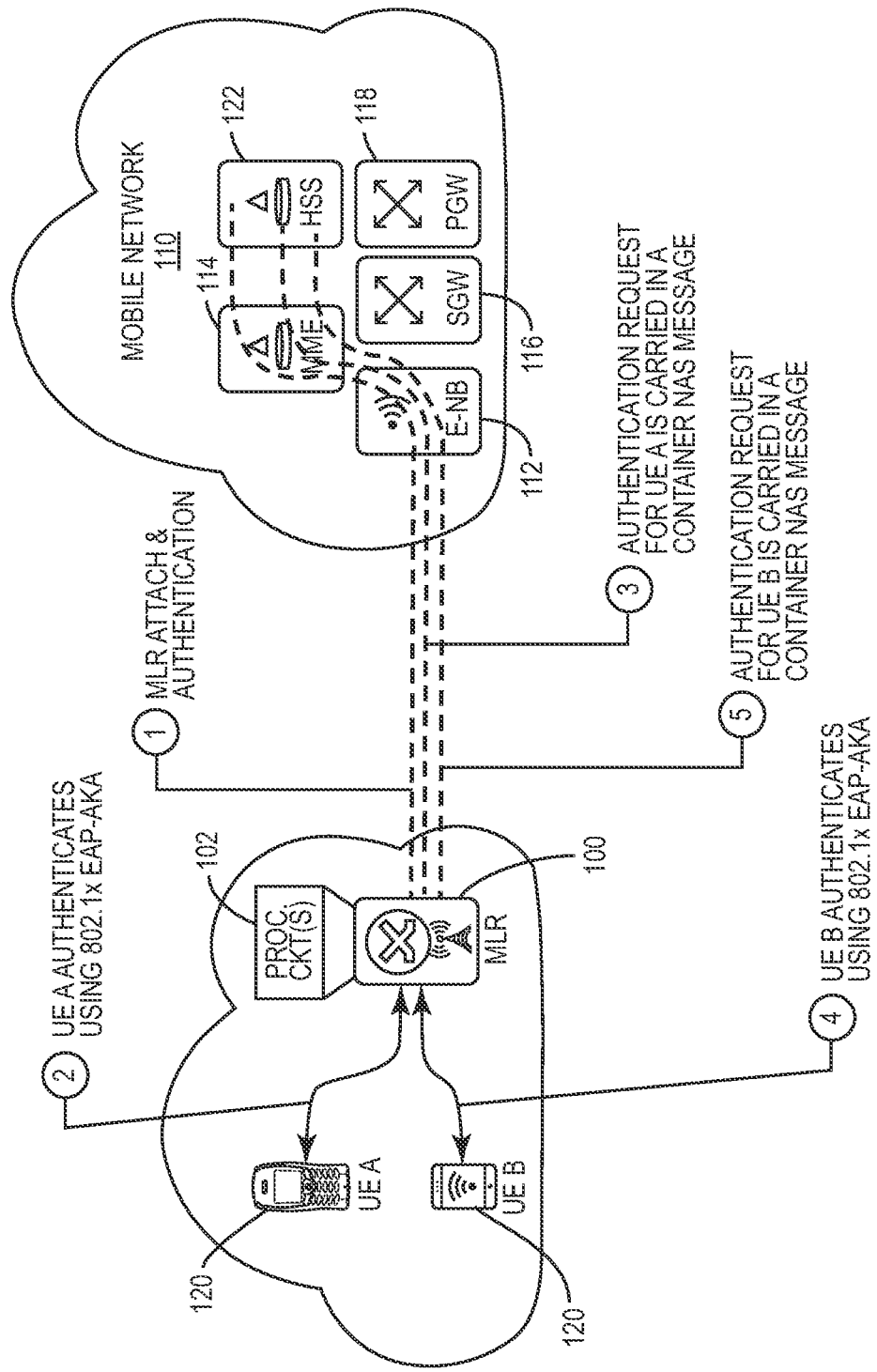
FIG. 4 illustrates an embodiment of a mobile router during authenticating WiFi wireless devices to a mobile communication network.
Figure 5A:
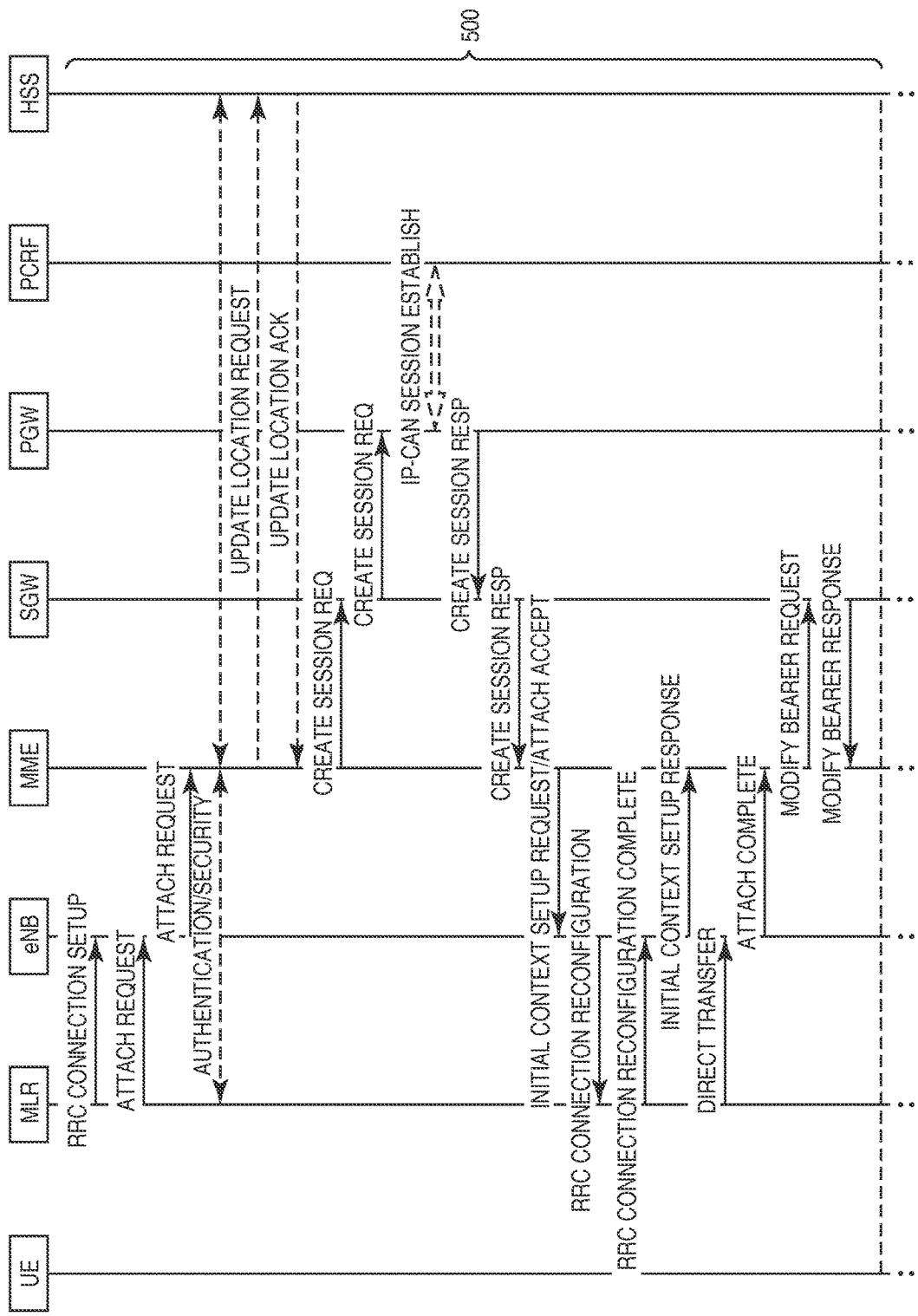

FIG. 4 shows an embodiment where the wireless devices 120 are WiFi devices (UE A and UE B). The MLR 100 performs a conventional attach and authentication procedure (Step 1 in FIG. 4) with the LTE network 110 over the router northbound interface via the eNB 112 of the LTE network 110, e.g. as illustrated by the typical sequence of requests and responses shown in region 500 of FIG. 5A.

Devices connecting to the MLR 100 through Wi-Fi can perform authentication through the use of a SIM (subscriber identity module) card, or a soft SIM for example. The MLR 100 can authenticate these devices using 802.1x, e.g. as illustrated by the sequence of requests and responses shown in region 510 of FIG. 5B. In one embodiment, an authentication request is sent from a particular UE to the MLR 100 as an EAPOL (EAP encapsulation over LAN) message and the MLR 100 forwards the authentication request to the eNB 112 in a non-access stratum message container.

In general, IP-CAN establishment and PDN connectivity between the MLR 100 and the LTE network 110 can be handled as previously described herein with reference to FIGS. 2 and 3. Following IP-CAN establishment and PDN connectivity between the MLR 100 and LTE network 110, the MLR 100 maps corresponding DHCP (dynamic host configuration protocol) requests received from a particular WiFi device on the router southbound interface to appropriate NAS (non-access stratum) messages on the northbound interface for transmission to the eNB 112 (Steps 2-5 in FIG. 4). Doing so allows the MME 114 and PGW 118 of the LTE network 110 to create a PDN connection and assign an IP address to the corresponding WiFi device. Each connection from a WiFi device can be viewed as a new PDP connection set up by the MLR 100. Multiple PDN connections may be set up for the same or different APNs (access point names). Attaching to multiple (separate) PDNs 130 by different devices 120 can be achieved by the use of multiple SSIDs on the southbound interface of the MLR 100. In each case, the sub-sessions associated with the WiFi UEs are anchored to the main MLR session.

Figure 6:
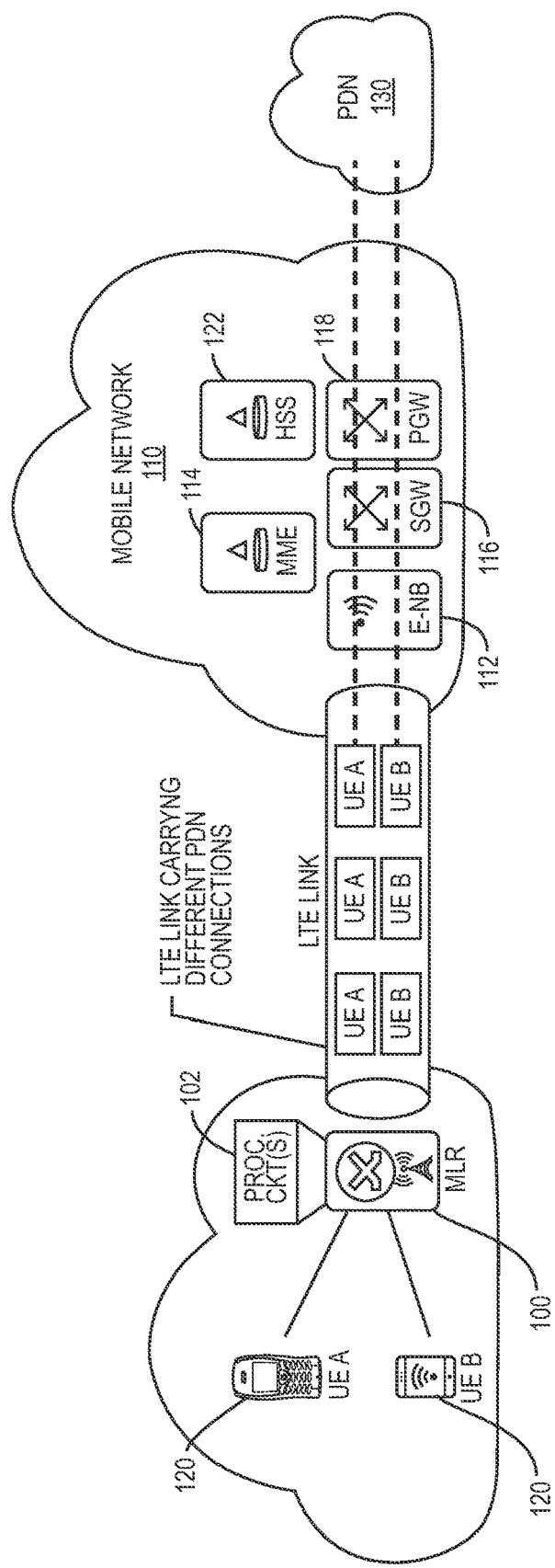
FIG. 6 illustrates an embodiment of an LTE link established between a mobile router and a mobile communication network for carrying individual PDN connections for devices connected to the mobile router.

FIG. 6 shows an embodiment where the LTE link between the MLR 100 and LTE network 1120 (to the external PDN 130) carries different PDN connections for different wireless devices (UE A and UE B) connected to the southbound interface of the MLR 100. The first PDN connection is associated with UE A and the second PDN connection is associated with UE B. UE A and UE B are viewed as individual devices attaching to the MLR 100 by the LTE network 110, and are reachable through respective network-assigned IP addresses e.g. as determined by establishing respective IP-CAN sessions for the different UEs as previously described herein.

Figure 7:
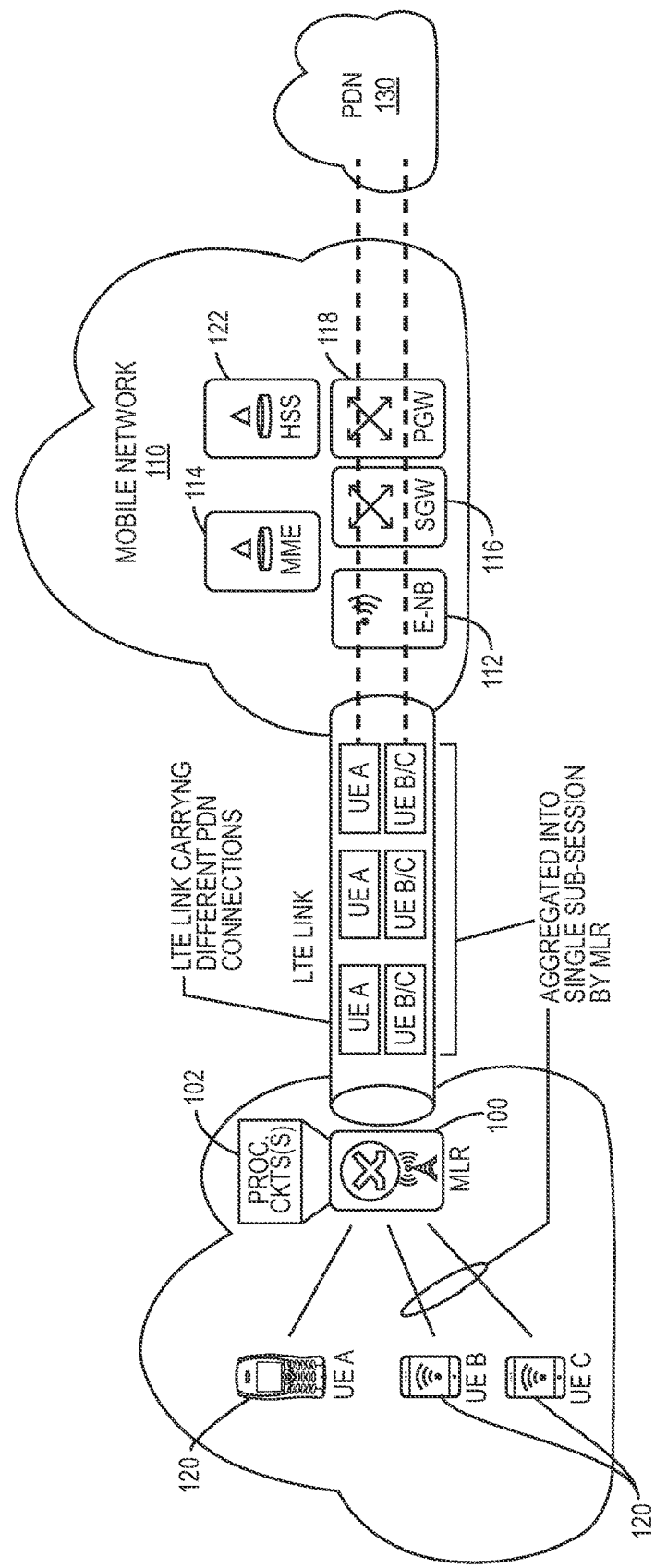
FIG. 7 illustrates an embodiment of an LTE link established between a mobile router and a mobile communication network over which messages for more than one device are aggregated onto a single PDN connection and for carrying individual PDN connections for other devices connected to the mobile router.

FIG. 7 shows an embodiment where some of the wireless devices (UE B and UE C) are power and/or limited functionality devices such as sensors, or specialized single function devices which may run a limited IP stack and have very low-power consumption requirements. These devices usually generate little traffic. For these types of devices, or for even full-function computing devices such as mobile phones, the MLR 100 can act as a proxy and aggregate a certain numbers of these devices into a single session as shown in FIG. 7. The LTE link caries one PDN connection for UE A, and therefore UE A is uniquely identifiable and serviceable by the LTE network 110. Traffic associated with UE B and UE C is aggregated into a single sub-session by the MLR 100 and is assigned a single PDN connection by the LTE network 110. The MLR 100 performs a similar function as when WiFi devices are connected by creating sub-sessions to the main session established between the MLR 100 and the LTE network 110. As such, UE B and UE C appear to be one device from the perspective of the LTE network 110. Alternatively, the MLR 100 can act as a pass-through device with regard to UE B and UE C, allowing each device to separately and uniquely register with the LTE network 110.

Features related to QoS mapping are performed at the MLR level. Different traffic flows are assigned different QoS based on policies associated with the device/user. The MLR 100 still carries and relays sub-session NAS messages, belonging to multiple devices attached to the southbound interface of the MLR 100.

The embodiments described herein provide inter-working functions which allow a mobile router to initiate on behalf of an attached device sub-session NAS messages which result in a session being created for the device in the mobile communication network. When a southbound device wants to establish a connection to a different PDN, the mobile router first establishes a connection to that PDN, as the sub-sessions are anchored to the main router session with the mobile network as previously described herein. Individual LTE and/or Wi-Fi devices can therefore access an LTE or other mobile communication network using a Wi-Fi or similar link with their respective subscription credentials. These devices therefore do not need to use the main gateway subscription associated with the mobile router. All subscription policies are available to the individual devices, mapped to the WiFi link characteristics.

Spatially relative terms such as "under", "below", "lower", "over", "upper" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A mobile router comprising:
    a southbound interface configured for communicatively connecting to a plurality of machine-type communication (MTC) devices using a first radio access technology;
    a northbound interface configured for communicatively connecting to a mobile communication network using a second radio access technology; and
    one or more processing circuits operatively associated with the southbound and northbound interfaces and configured to:
        connect to the plurality of MTC devices via the southbound interface;
        establish, by the mobile router, a main communication session between the mobile router and the mobile communication network via the northbound interface, including authenticating the mobile router to the mobile communication network; and
        operate as a proxy for the plurality of MTC devices, including relaying signaling between individual ones of the plurality of MTC devices and the mobile communication network via respective sub-sessions of the main communication session, each sub-session being created by the mobile router, anchored to the main communication session, and providing a Packet Data Network (PDN) connection between the mobile communication network and one or more of the MTC devices.

2. The mobile router of claim 1, wherein, for operating as said proxy, the one or more processing circuits are configured to aggregate traffic from the plurality of MTC devices, for transmission to the mobile communication network via the main communication session.

3. The mobile router of claim 1, wherein, for operating as said proxy, the one or more processing circuits are configured to initiate sub-session non-access stratum messages on behalf of respective ones of the MTC devices, to thereby create the PDN connections for respective ones of the MTC devices in the mobile communication network.

4. The mobile router of claim 3, wherein, in response to an authentication request sent from one of said plurality of MTC devices as an EAPOL (EAP encapsulation over LAN) message, the one or more processing circuits are configured to forward the authentication request to the mobile communication network in a non-access stratum message container.

5. The mobile router of claim 1, wherein the southbound interface comprises one of a ZIGBEE radio interface and a Wi-Fi radio interface.

6. A method of proxy operation at a mobile router comprising:
    connecting to a plurality of machine-type communication (MTC) devices via a southbound interface of the mobile router that uses a first radio access technology;
    connecting to a mobile communication network via a northbound interface of the mobile router that uses a second radio access technology;
    establishing, by the mobile router, a main communication session between the mobile router and the mobile communication network via the northbound interface, including authenticating the mobile router to the mobile communication network; and operating as a proxy for the plurality of MTC devices, including relaying signaling between individual ones of the plurality of MTC devices and the mobile communication network via respective sub-sessions of the main communication session, each sub-session being created by the mobile router, anchored to the main communication session, and providing a Packet Data Network (PDN) connection between the mobile communication network and one or more of the MTC devices.

7. The method of claim 6, wherein operating as said proxy includes aggregating traffic from the plurality of MTC devices, for transmission to the mobile communication network via the main communication session.

8. The method of claim 6, wherein operating as said proxy includes initiating sub-session non-access stratum messages on behalf of respective ones of the MTC devices, to thereby create the PDN connections for respective ones of the MTC devices in the mobile communication network.

9. The method of claim 8, further comprising, in response to an authentication request sent from one of said plurality of MTC devices as an EAPOL (EAP encapsulation over LAN) message, forwarding the authentication request to the mobile communication network in a non-access stratum message container.

10. The method of claim 6, wherein connecting to the plurality of MTC devices via the southbound interface comprises connecting to the plurality of MTC devices using ZIGBEE or Wi-Fi communications.

* * * * *

UNITED STATES PATENT AND TRADEMARK OFFICE
CERTIFICATE OF CORRECTION

PATENT NO. : 10,080,255 B2
APPLICATION NO. : 14/312195
DATED : September 18, 2018
INVENTOR(S) : Touati et al.

Page 1 of 1

It is certified that error appears in the above-identified patent and that said Letters Patent is hereby corrected as shown below:

In Column 1, Line 9, delete "2011." and insert -- 2011, now Pat. No. 8,806,042. --, therefor.

In Column 3, Lines 47-48, delete "mobile router 110" and insert -- mobile router 100 --, therefor.

In Column 4, Line 27, delete "mobile router 110" and insert -- mobile router 100 --, therefor.

Signed and Sealed this
Fourth Day of December, 2018

Andrei Iancu
*Director of the United States Patent and Trademark Office*